US012748345B2

(12) United States Patent
Lee et al.

(10) Patent No.: US 12,748,345 B2
(45) Date of Patent: Sep. 29, 2026

(54) PROJECTION DEVICE

(71) Applicant: Coretronic Corporation, Hsin-Chu (TW)

(72) Inventors: Wei-Yi Lee, Hsin-Chu (TW); Wen-Hao Chu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 186 days.

(21) Appl. No.: 18/495,765

(22) Filed: Oct. 27, 2023

(65) Prior Publication Data

US 2024/0142865 A1 May 2, 2024

(30) Foreign Application Priority Data

Oct. 31, 2022 (CN) ......................... 202211344625.0

(51) Int. Cl.
*G03B 21/16* (2006.01)
*G03B 31/00* (2021.01)

(52) U.S. Cl.
CPC ............. *G03B 21/16* (2013.01); *G03B 31/00* (2013.01)

(58) Field of Classification Search
CPC ................................ G03B 21/16; G03B 31/00
USPC ............................................................ 353/57
See application file for complete search history.

(56) References Cited

U.S. PATENT DOCUMENTS

| | | | | |
|---|---|---|---|---|
| 6,421,239 B1 * | 7/2002 | Huang | H01L 23/467 361/717 |
| 7,052,144 B2 * | 5/2006 | Nakamura | G03B 21/16 353/61 |
| 10,911,730 B1 | 2/2021 | Hu et al. | |
| 11,394,937 B1 | 7/2022 | Hu et al. | |
| 2005/0001988 A1 * | 1/2005 | Sample | G03B 21/16 353/52 |
| 2006/0044513 A1 * | 3/2006 | Sakurai | H04N 9/3144 353/20 |

(Continued)

FOREIGN PATENT DOCUMENTS

| | | |
|---|---|---|
| CN | 103324013 | 9/2013 |
| CN | 208752380 | 4/2019 |

(Continued)

OTHER PUBLICATIONS

Translation of WO_2020262024_A1 (Year: 2025).*

(Continued)

*Primary Examiner* — Jerry L Brooks

(74) *Attorney, Agent, or Firm* — JCIPRNET

(57) ABSTRACT

A projection device includes a casing, a projection lens, a light valve module, a light source module, a first heat dissipation module, a second heat dissipation module, a fan, and a guiding member. The first heat dissipation module is disposed corresponding to a first air inlet of a first side cover and connected to the light valve module, and the second heat dissipation module is disposed corresponding to a second air inlet of a second side cover and connected to the light source module. An airflow in an accommodating space of the casing is guided to the guiding member by the fan, and is transferred from the guiding member to an air outlet to flow out of the casing. A direction of an image beam of the projection lens is different from an airflow direction flowing out from the air outlet of a third side cover.

15 Claims, 6 Drawing Sheets

(56) References Cited

U.S. PATENT DOCUMENTS

2011/0019161 A1* 1/2011 Chen .................... H04N 9/3144
353/61

FOREIGN PATENT DOCUMENTS

| | | | | | |
|---|---|---|---|---|---|
| CN | 117192881 | | 12/2023 | | |
| JP | 2015001686 A | * | 1/2015 | | |
| TW | I322326 | | 3/2010 | | |
| TW | 201122709 | | 7/2011 | | |
| WO | WO-2020262024 A1 | * | 12/2020 | ............... | H04N 5/74 |

OTHER PUBLICATIONS

Translation of JP_2015001686 (Year: 2025).*
"Office Action of China counterpart Application", issued on Jul. 7, 2026, p. 1-p. 10.

* cited by examiner

PROJECTION DEVICE

CROSS-REFERENCE TO RELATED APPLICATION

This application claims the priority benefit of China application serial no. 202211344625.0, filed on Oct. 31, 2022. The entirety of the above-mentioned patent application is hereby incorporated by reference herein and made a part of this specification.

BACKGROUND

Technical Field

The disclosure relates to an optical device, and in particular relates to a projection device.

Description of Related Art

Generally speaking, the thermal system of a consumer laser diode (LD) projector includes a laser heat/light source, a heat sink, fins, and a fan. In recent years, the consumer projectors are trending toward becoming thinner, lighter, and smaller, and there are more arrangement restrictions to maintain the cooling of the system in a limited space. In addition, if the air outlet direction of the fan is the same as the projection direction, there is a risk of thermal disturbance affecting the image. Furthermore, if the air outlet direction is to be changed to a side air outlet of the casing, this would restrict the arrangement of the fan, and if the distance between the fan and the air outlet is too close, the flow resistance would be too high and the air flow of the system would be affected. In addition, the high flow resistance of the air outlet which brings forth strong and uneven wind speed will also cause poor user experience.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projection device, which may prevent the image from being affected by thermal disturbance.

The other objectives and advantages of the present invention may be further understood from the descriptive features disclosed in the present invention.

In order to achieve one of, or portions of, or all of the above objectives or other objectives, the present invention provides a projection device, including a casing, a projection lens, a light valve module, a light source module, a first heat dissipation module, a second heat dissipation module, a fan, and a guiding member. The casing has a first side cover, a second side cover, a third side cover and a fourth side cover. The first side cover, the second side cover, the third side cover and the fourth side cover define an accommodating space. The first side cover is opposite to the third side cover and connected to the second side cover and the fourth side cover, the second side cover is opposite to the fourth side cover, the first side cover has a first air inlet, the second side cover has a second air inlet, and the third side cover has an air outlet. The first heat dissipation module, the second heat dissipation module, the light valve module, and the light source module are disposed in the accommodating space, the first heat dissipation module is disposed corresponding to the first air inlet and connected to one of the light valve module or the light source module, and the second heat dissipation module is disposed corresponding to the second air inlet and connected to the other one of the light valve module or the light source module. The guiding member and the fan are disposed in the accommodation space of the casing and are adjacent to the third side cover. An airflow in the accommodating space of the casing is guided to the guiding member by the fan, and is transferred from the guiding member to the air outlet to flow out of the casing. The projection lens is located on the fourth side cover, and a direction of an image beam of the projection lens is different from an airflow direction flowing out from the air outlet of the third side cover.

Based on the above, the embodiments of the present invention have at least one of the following advantages or effects. In the projection device of the present invention, thermal disturbance may be prevented by guiding the hot air from the air outlet to a direction different from that of the projection surface through the guiding member.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as “top,” “bottom,” “front,” “back,” etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
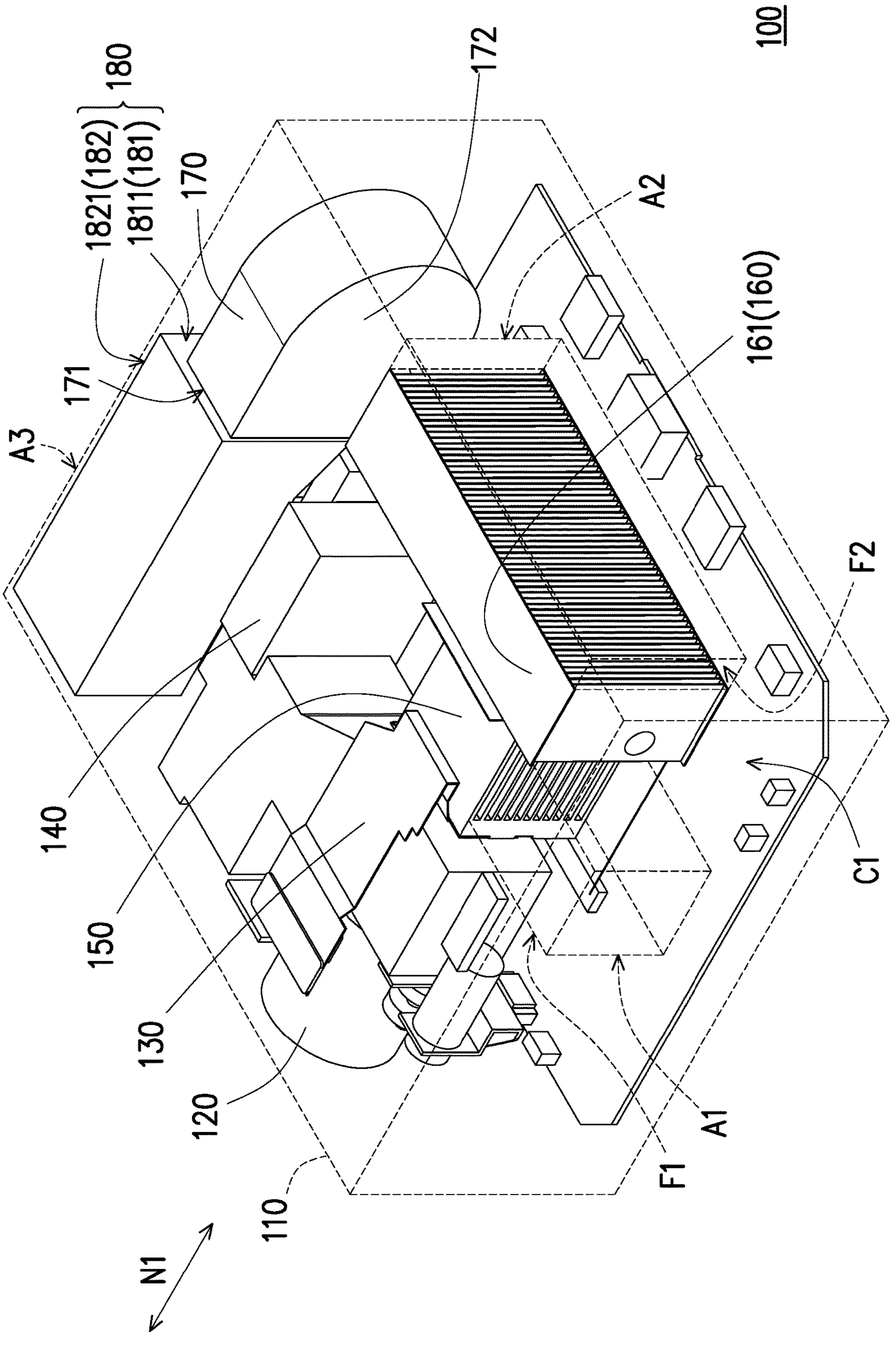
FIG. 1 is a three-dimensional schematic view of a projection device according to an embodiment of the present invention.
Figure 2:
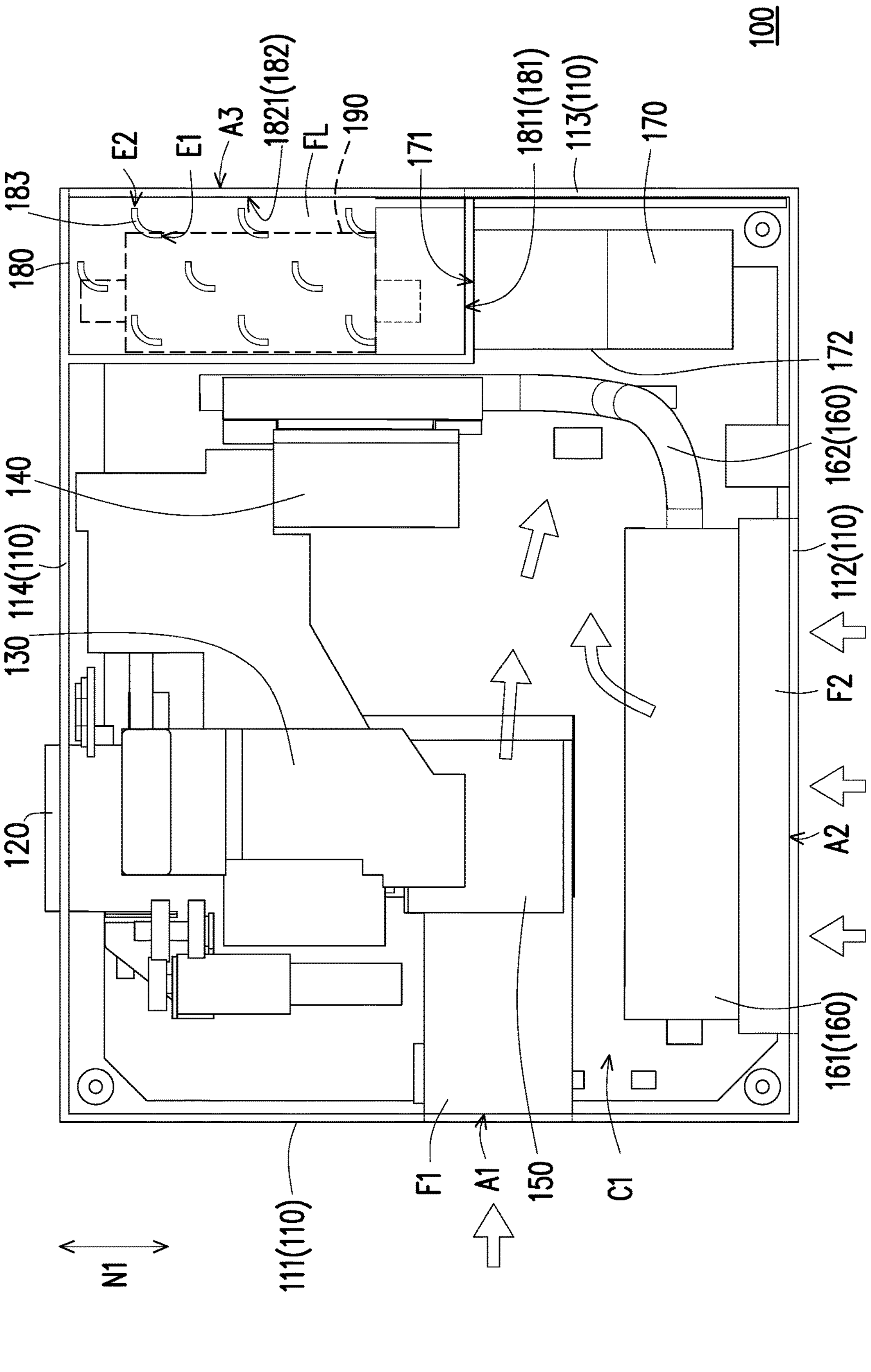
FIG. 2 is a top schematic view of the projection device in FIG. 1.
Figure 3:
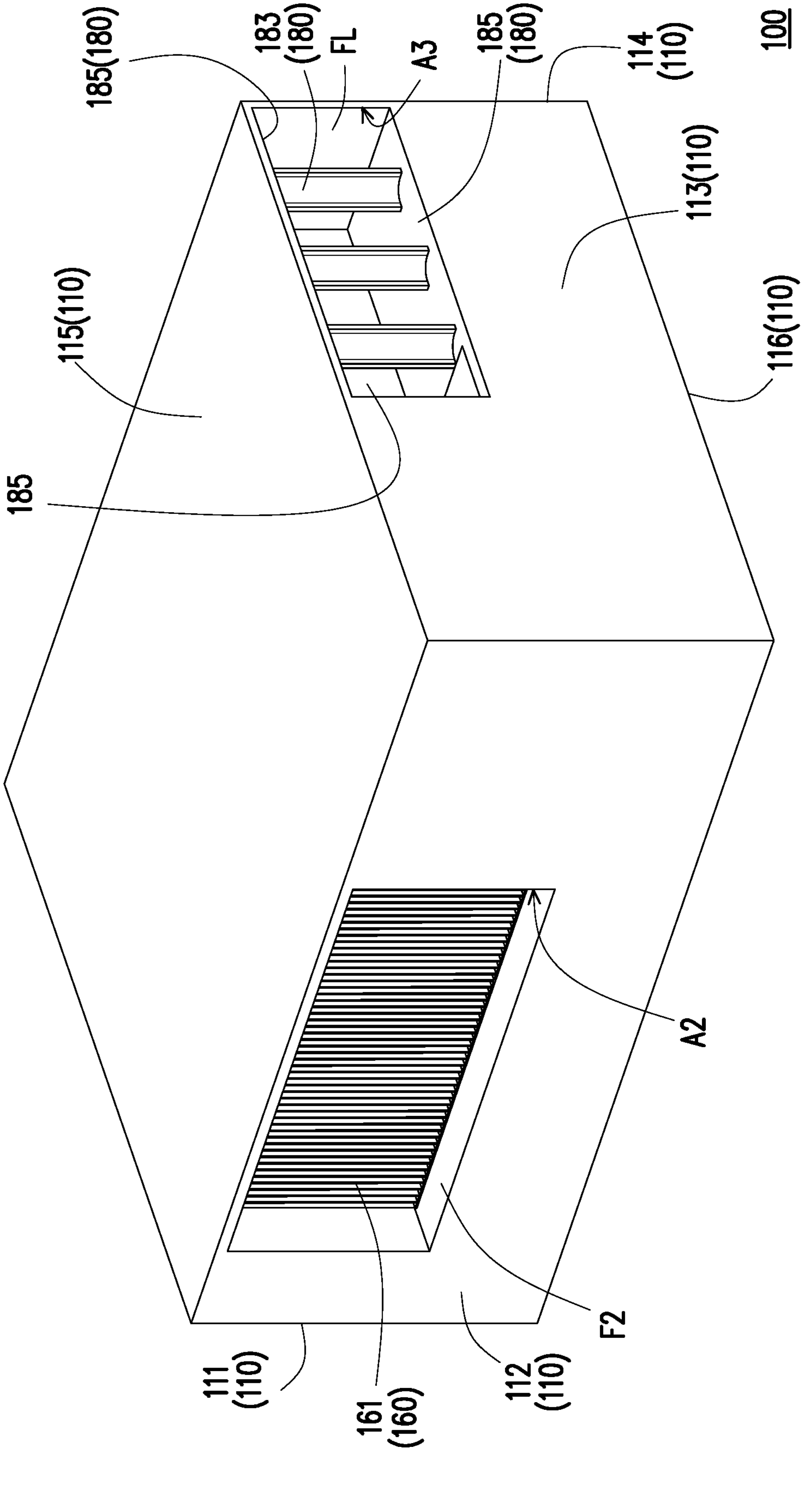
FIG. 3 is a three-dimensional schematic view of another viewing angle of the projection device in FIG. 1.

FIG. 1 is a three-dimensional schematic view of a projection device according to an embodiment of the present invention. FIG. 2 is a top schematic view of the projection device in FIG. 1. FIG. 3 is a three-dimensional schematic view of another viewing angle of the projection device in FIG. 1. In order for the drawings to be clearer, the casings in FIG. 1 and FIG. 2 are shown with dashed lines, and the shelter of the air inlet and air outlet in FIG. 3 are omitted.

Referring to FIG. 1, the projection device 100 of this embodiment includes a casing 110, a projection lens 120, a light valve module 130, a light source module 140, a first heat dissipation module 150, a second heat dissipation module 160, a fan 170, and a guiding member 180.

In this embodiment, the projection device 100 is, for example, a laser projector, the light valve module 130 is, for example, a digital micromirror device (DMD), the light source module 140 includes, for example, a laser light source, and the fan 170 is, for example, a blower fan, but the present invention is not limited thereto.

Referring to FIG. 2, in this embodiment, the casing 110 has a first side cover 111, a second side cover 112, a third side cover 113, and a fourth side cover 114. The first side cover 111, the second side cover 112, the third side cover 113, and the fourth side cover 114 define an accommodating space C1. The first side cover 111 is opposite to the third side cover 113 and connected to the second side cover 112 and the fourth side cover 114, and the second side cover 112 is opposite to the fourth side cover 114. The first side cover 111 has a first air inlet A1, the second side cover 112 has a second air inlet A2, and the third side cover 113 has an air outlet A3. In this embodiment, the first air inlet A1, the second air inlet A2, and the air outlet A3 are covered by, for example, a plate with air holes, or a mesh cloth (not shown) may be disposed for airflow to pass through smoothly and achieve the effect of dust prevention, which is not limited by the present invention.

In this embodiment, the accommodating space C1 of the casing 110 further includes a first air intake guide F1 and a second air intake guide F2. The first air intake guide F1 is connected between the first air inlet A1 and the first heat dissipation module 150. The second air intake guide F2 is connected between the second air inlet A2 and the second heat dissipation module 160. The first air intake guide F1 and the second air intake guide F2 are disposed independently of each other to avoid temperature interference.

In this embodiment, the light valve module 130 and the light source module 140 are, for example, main heat sources of the projection device 100, so they are respectively placed at the two air inlet ends (the first air inlet A1 and the second air inlet A2) of the projection device 100. One of the light valve module 130 or the light source module 140 is connected to the first heat dissipation module 150 to dissipate heat. The other one of the light valve module 130 or light source module 140 dissipates heat through the second heat dissipation module 160. The second heat dissipation module 160 includes a heat dissipation fin set 161 and a heat pipe 162. The heat pipe 162 is connected between the heat dissipation fin set 161 and the other one of the light valve module 130 or the light source module 140 to dissipate heat from the other one of the light valve module 130 or light source module 140, but the present invention is not limited thereto.

Specifically, in this embodiment, the first heat dissipation module 150, the second heat dissipation module 160, the light valve module 130, and the light source module 140 are disposed in the accommodating space C1. The fan 170 is closer to the second air inlet A2 than the guiding member 180. In this way, since the airflow flowing out from the first heat dissipation module is directly aimed at the fan 170, and the airflow flowing out from the second heat dissipation module is also adjacent to the fan 170, the airflow may be directly guided by the fan 170 to the guiding member 180, thereby shortening the path of the airflow in the casing, but the present invention is not limited thereto.

In this embodiment, the first heat dissipation module 150 is disposed corresponding to the first air inlet A1 and connected to the light valve module 130, and the first heat dissipation module 150 is connected to the first air inlet A1 through the first air intake guide F1, so that the airflow may pass through efficiently and cool the one of the light valve module 130 or the light source module 140. In this embodiment, the second heat dissipation module 160 is disposed corresponding to the second air inlet A2 and connected to the other one of the light valve module 130 or the light source module 140, and the second heat dissipation module 160 is connected to the second air inlet A2 through the second air intake guide F2, so that the airflow may pass through efficiently and cool the other one of the light valve module 130 or the light source module 140.

Since the temperature of the airflow after cooling the light valve module 130 and the light source module 140 rises, the temperature-sensitive elements should avoid being placed downstream. In this embodiment, elements with relatively high temperature resistance are suitable to be placed downstream, such as the speaker 190. As shown in FIG. 2 and FIG. 3, the casing 110 also has an upper cover 115 and a lower cover 116, the upper cover 115 is opposite to the lower cover 116 and is connected to the first side cover 111, the second side cover 112, the third side cover 113, and the fourth side cover 114 to form the accommodating space C1. The accommodating space C1 of the casing 110 further includes a speaker 190, and the speaker 190 is adjacently disposed between the guiding member 180 and the lower cover 116 (i.e., the downstream), but the present invention is not limited thereto.

In this embodiment, the projection lens 120 protrudes from the fourth side cover 114, but the invention is not limited thereto. The projection lens 120 has a projection direction N1, and is parallel to the first side cover 111 and the third side cover 113. The first air inlet A1 is perpendicular to the second air inlet A2, and the air outlet A3 is parallel to the first air inlet A1, but the present invention is not limited thereto. In this embodiment, the direction of the image beam of the projection lens 120 is different from the airflow direction flowing out from the air outlet A3 of the third side cover 113. That is to say, the extending direction of the optical axis of the projection lens 120 is different from the airflow direction flowing out from the air outlet A3, so as to avoid the problem of thermal disturbance on the projection lens 120 and affecting the imaging quality caused by the air outlet A3 facing the projection image. Moreover, the fourth side cover 114 of this embodiment does not have an air inlet and an air outlet, which may also be used to avoid thermal disturbances to the projection lens 120 and affecting the imaging quality, but the present invention is not limited thereto.

In this embodiment, the guiding member 180 and the fan 170 are disposed in the accommodation space C1 and adjacent to the air outlet A3 of the third side cover 113. The fan 170 has an air inlet surface 172, the airflow in the accommodating space C1 is guided by the fan 170 to the guiding member 180, and is transferred from the guiding member 180 to the air outlet A3 to flow out of the casing 110.

In this embodiment, the air inlet surface 172 of the fan 170 faces the first side cover 111, which may have lower flow resistance. The guiding member 180 includes an inlet end 181 and an outlet end 182, the inlet end 181 is connected to the air exit portion 171 of the fan 170, and the outlet end 182 is connected to the air outlet A3 of the third side cover 113. In this embodiment, an end surface 1821 of outlet end 182 of the guiding member 180 is perpendicular to an end surface 1821 of the inlet end 181. In other embodiments, an end surface 1821 of the outlet end 182 of the guiding member 180 is not parallel to an end surface 1811 of the inlet end 181, the present invention is not limited thereto.

In this embodiment, the area of the outlet end 182 is greater than the area of the inlet end 181 of the guiding member 180. Such a design may reduce the occurrence of backflow, reduce the system flow resistance, and increase the system flow rate, so that the wind is more evenly distributed for a slower and more stable wind flow.

In this embodiment, the guiding member 180 includes multiple partitions 185 forming the air flow channel FL, and the partitions 185 are integrally formed with the casing 110, the present invention is not limited thereto. In this embodiment, the inlet end 181 of the guiding member 180 covers the air exit portion 171 of the fan 170. Furthermore, the guiding member 180 includes arc-shaped plates 183 located on the air flow channel FL for turning the flow field.

In this embodiment, the arc-shaped plates 183 are scattered, and for example, are integrally formed with the partitions 185 corresponding to the upper cover 115 and the lower cover 116, but the present invention is not limited thereto. The arc-shaped plate 183 has opposite first terminal E1 and second terminal E2, the first terminal E1 faces toward the air exit portion 171 of the fan 170, and the second terminal E2 faces toward the air outlet A3 of the third side cover 113.

Furthermore, the turning point between the first terminal E1 and the second terminal E2 has a curvature, so that the wind flow gradually turns. In this embodiment, the arithmetic average roughness (Ra) of the inner wall of the guiding member 180 and the arc-shaped plate 183 is less than 0.06 micron, and the ten-point average roughness (Rz) is less than 0.4 micron. The roughness may be reduced to reduce pressure drop due to friction, but the invention is not limited thereto.

In this embodiment, there are multiple arc-shaped plates 183, and the arc-shaped plates 183 may be arranged in a staggered, aligned, or irregular manner. For example, the arrangement of the arc-shaped plates 183 may be determined by the relative size between the inlet end 181 and the outlet end 182 of the guiding member 180. If the inlet end 181 and the outlet end 182 have the same size, the arc-shaped plates 183 are approximately parallel to each other, and the present invention is not limited thereto.

Figure 4:
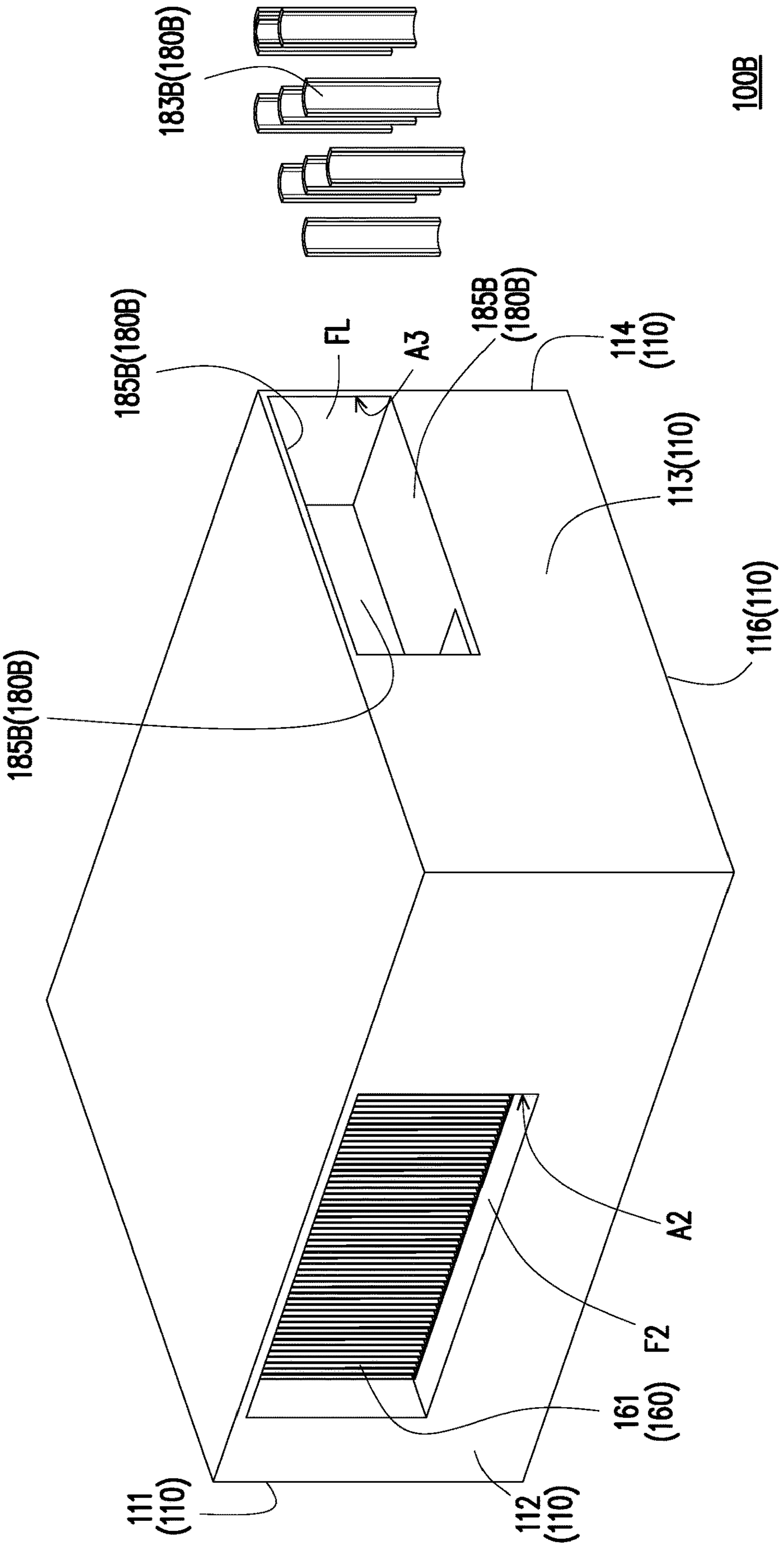
FIG. 4 is a schematic view of a projection device according to another embodiment of the present invention.

Referring to FIG. 3, in this embodiment, the arc-shaped plate 183 and the guiding member 180 are integrally formed, but the present invention is not limited thereto. FIG. 4 is a schematic view of a projection device according to another embodiment of the present invention. In order for the drawings to be clearer, the shelter of the air inlet and air outlet in FIG. 4 are omitted. In this embodiment, the arc-shaped plates 183B and the partitions 185B of the projection device 100B are two separate portions, and the arc-shaped plates 183B may be fixed to the partitions 185B by engaging or welding, but the present invention is not limited thereto.

Other embodiments are described below for illustrative purposes. I It is to be noted that the following embodiments use the reference numerals and a part of the contents of the above embodiments, and the same reference numerals are used to denote the same or similar elements, and the description of the same technical contents is omitted. For the description of the omitted part, reference may be made to the above embodiments, and details are not described in the following embodiments.

Figure 5:
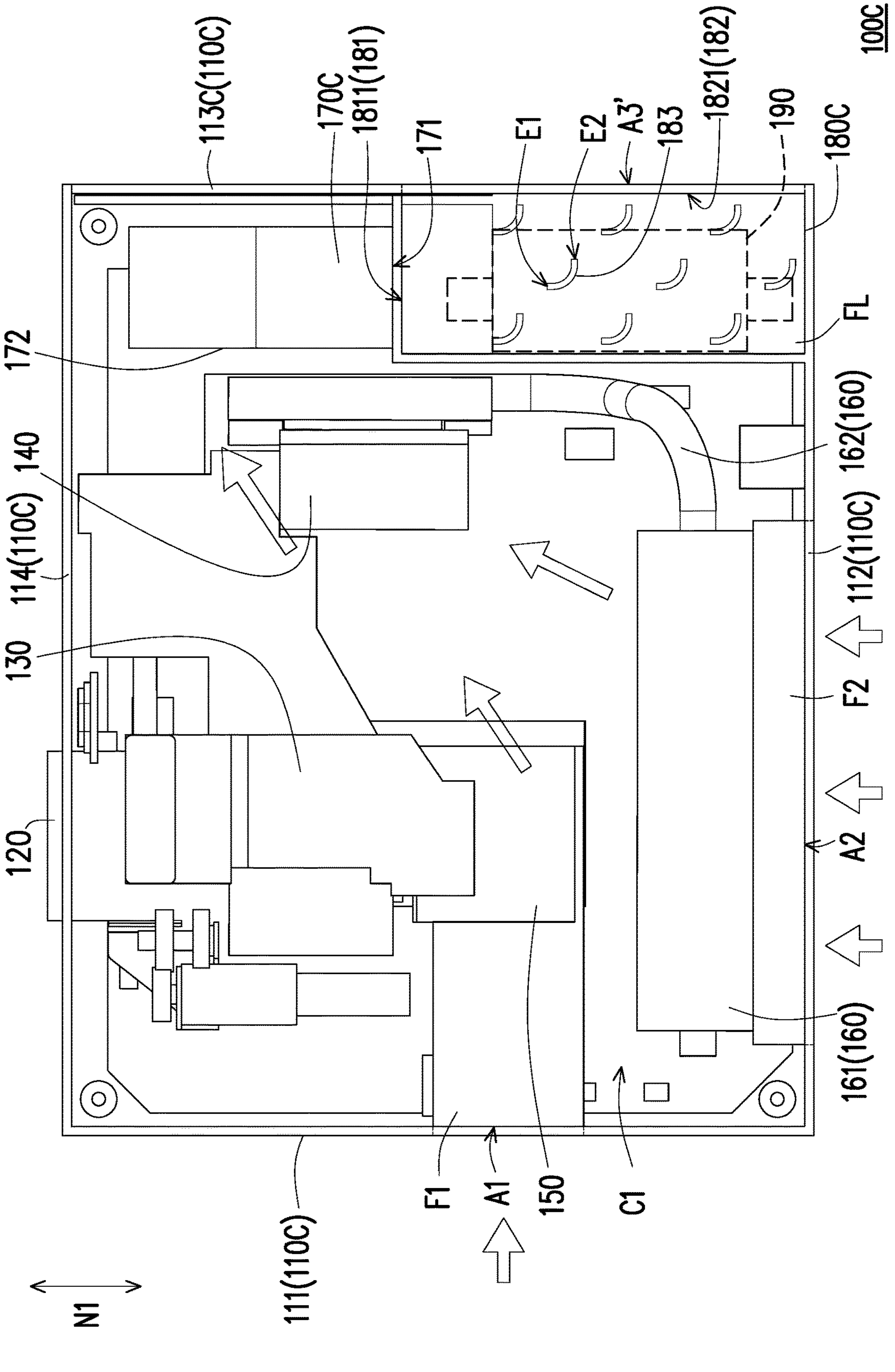
FIG. 5 and FIG. 6 are top schematic views of various projection devices according to other embodiments of the present invention.
Figure 6:
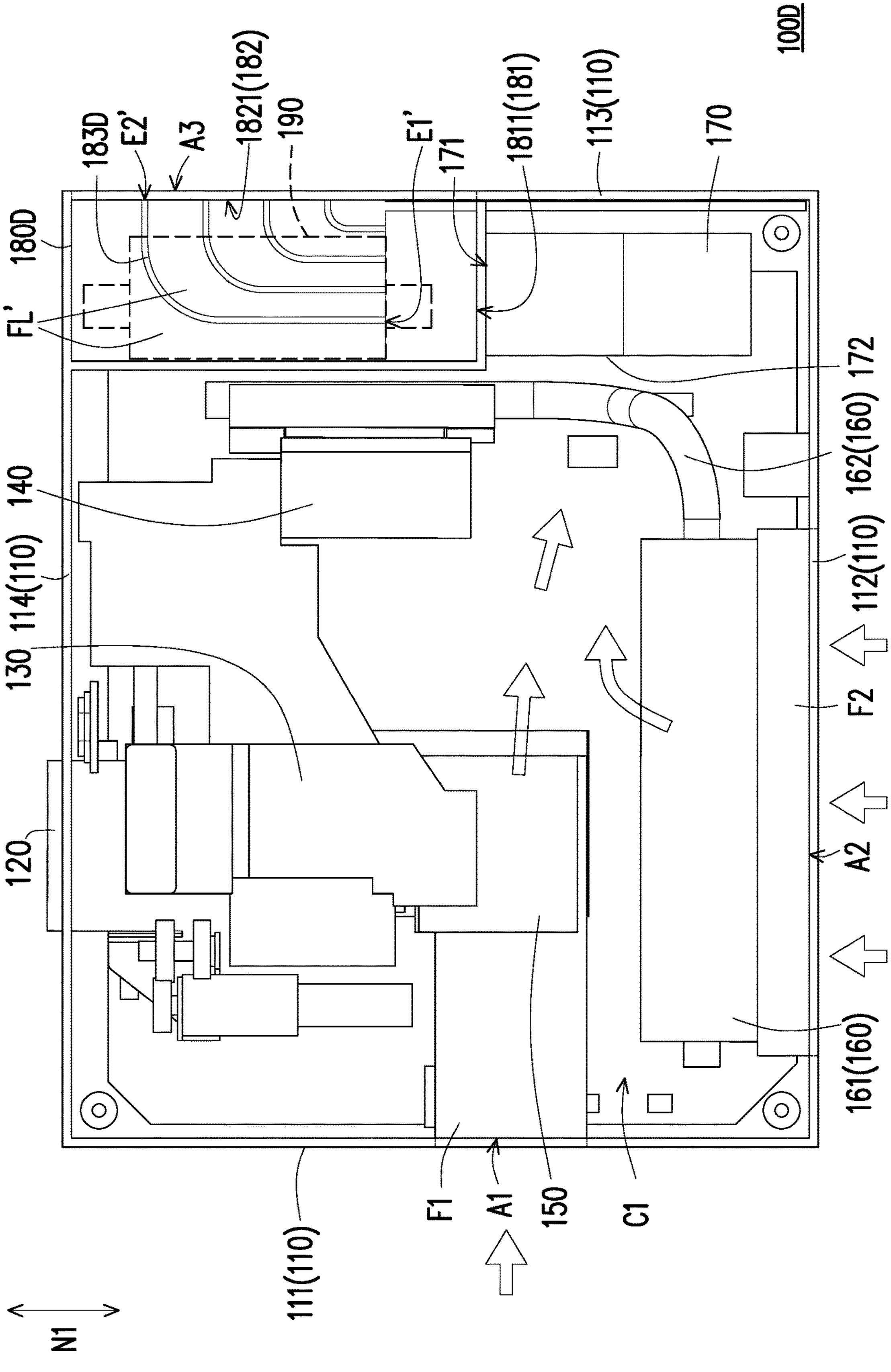

FIG. 5 and FIG. 6 are top schematic views of various projection devices according to other embodiments of the present invention. Referring to FIG. 5 first, in this embodiment, the projection device 100C is slightly different from the projection device 100 in FIG. 2, the main difference being that the guiding member 180C of the projection device 100C is closer to the second air inlet A2 than the fan 170C. The third side cover 113C of the casing 110C has an air outlet A3', and the air outlet A3' is close to the second side cover 112. Compared with the architecture of FIG. 2, the airflow in this embodiment flows out of the first heat dissipation module 150 and the second heat dissipation module 160 and then flows through the light source module 140 before being guided to the guiding member 180 by the fan 170. Although the average path of the airflow is increased, there is no turning at a large angle, so that the backflow of the airflow at the turning point may be avoided.

Referring to FIG. 6, in this embodiment, the projection device 100D is slightly different from the projection device 100 in FIG. 2, the main difference being that the first terminal E1' of the arc-shaped plate 183D of the projection device 100D extends to the inlet end 181 of the guiding member 180D and faces the air exit portion 171 of the fan 170, and the second terminal E2' of the arc-shaped plate 183D extends to the outlet end 182 of the guiding member 180 and faces the air outlet A3, to form multiple connecting airflow channels FL'. The arrangement of the arc-shaped plates 183D depends on the relative size between the inlet end 181 and the outlet end 182 of the guiding member 180D, and the arc-shaped plates 183D may not be parallel to each other. If the inlet end 181 and the outlet end 182 have the same size, the arc-shaped plates 183D may be approximately parallel to each other, but the present invention is not limited thereto.

In summary, the embodiments of the present invention have at least one of the following advantages or effects. In the projection device of the present invention, the first air intake guide and the second air intake guide are disposed independently of each other to avoid temperature interference. Moreover, the hot air from the air outlet may be guided in a direction different from that of the projection surface through the guiding member to avoid thermal disturbance, so as to obtain a higher quality projection image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term “the invention”, “the present invention” or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising a casing, a projection lens, a light valve module, a light source module, a first heat dissipation module, a second heat dissipation module, a fan, and a guiding member, wherein:

the casing has a first side cover, a second side cover, a third side cover, and a fourth side cover, the first side cover, the second side cover, the third side cover, and the fourth side cover define an accommodating space, the first side cover is opposite to the third side cover and connected to the second side cover and the fourth side cover, the second side cover is opposite to the fourth side cover, the first side cover has a first air inlet, the second side cover has a second air inlet, the third side cover has an air outlet, the fourth side cover is provided without an air inlet and an air outlet;

the first heat dissipation module, the second heat dissipation module, the light valve module, and the light source module are disposed in the accommodating space, the first heat dissipation module is disposed corresponding to the first air inlet and connected to one of the light valve module or the light source module, the second heat dissipation module is disposed corresponding to the second air inlet and connected to the other one of the light valve module or the light source module;

the guiding member and the fan are disposed in the accommodation space of the casing and are adjacent to the third side cover, an airflow in the accommodating space of the casing is guided to the guiding member by the fan, and is transmitted from the guiding member to the air outlet to flow out of the casing; and the projection lens protrudes from the fourth side cover, and a direction of an image beam projected from the projection lens is different from an airflow direction flowing out from the air outlet of the third side cover, wherein the fan comprises an air inlet surface facing the first side cover, and the guiding member is adjacent to the air outlet of the third side cover.

2. The projection device according to claim 1, wherein the guiding member comprises an inlet end and an outlet end, the inlet end is connected to an air exit portion of the fan, and the outlet end is connected to the air outlet of the third side cover.

3. The projection device according to claim 2, wherein an area of the outlet end of the guiding member is greater than an area of the inlet end of the guiding member.

4. The projection device according to claim 2, wherein an end surface of the outlet end of the guiding member is not parallel to an end surface of the inlet end of the guiding member.

5. The projection device according to claim 1, wherein the guiding member forms an airflow channel, the guiding member comprises at least one arc-shaped plate located in the airflow channel, the at least one arc-shaped plate has a first terminal and a second terminal that are opposite to each other, the first terminal faces toward an air exit portion of the fan, and the second terminal faces toward the air outlet of the third side cover.

6. The projection device according to claim 5, wherein an arithmetic average roughness of an inner wall of the guiding member and the at least one arc-shaped plate is less than 0.06 micron, and a ten-point average roughness is less than 0.4 micron.

7. The projection device according to claim 5, wherein the at least one arc-shaped plate and the guiding member are integrally formed.

8. The projection device according to claim 5, wherein the first terminal of the at least one arc-shaped plate extends to an inlet end of the guiding member and faces the air exit portion of the fan, and the second terminal of the at least one arc-shaped plate extends to an outlet end of the guiding member and faces the air outlet.

9. The projection device according to claim 5, wherein a number of the at least one arc-shaped plate is multiple, and the multiple arc-shaped plates are arranged in a staggered, aligned, or irregular manner.

10. The projection device according to claim 1, wherein the guiding member comprises a plurality of partitions, the partitions form an airflow channel, and an inlet end of the guiding member covers an exit portion of the fan.

11. The projection device according to claim 1, wherein the accommodating space of the casing further comprises a first air intake guide and a second air intake guide, the first air intake guide is connected between the first air inlet and the first heat dissipation module, and the second air intake guide is connected between the second air inlet and the second heat dissipation module, wherein the first air intake guide and the second air intake guide are disposed independently of each other.

12. The projection device according to claim 1, wherein the second heat dissipation module comprises a heat dissipation fin set and a heat pipe, the heat pipe is connected to the heat dissipation fin set and the light source module.

13. The projection device according to claim 1, wherein the fan is closer to the second air inlet than the guiding member.

14. The projection device according to claim 1, wherein the guiding member is closer to the second air inlet than the fan.

15. The projection device according to claim 1, wherein the casing further has an upper cover and a lower cover, the upper cover is opposite to the lower cover and is connected to the first side cover, the second side cover, the third side cover, and the fourth side cover to form the accommodating space, wherein the accommodating space of the casing further comprises a speaker, and the speaker is adjacently disposed between the guiding member and the lower cover.

* * * * *